(12) United States Patent
Tomkins et al.

(10) Patent No.: US 9,749,274 B1
(45) Date of Patent: *Aug. 29, 2017

(54) ASSOCIATING AN EVENT ATTRIBUTE WITH A USER BASED ON A GROUP OF ONE OR MORE ELECTRONIC MESSAGES ASSOCIATED WITH THE USER

(71) Applicant: Google Inc., Mountain View, CA (US)

(72) Inventors: Andrew Tomkins, Menlo Park, CA (US); Shanmugasundaram Ravikumar, Berkeley, CA (US); Shalini Agarwal, San Francisco, CA (US); Bo Pang, Sunnyvale, CA (US); Mark Yinan Li, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/333,908

(22) Filed: Oct. 25, 2016

Related U.S. Application Data

(63) Continuation of application No. 15/139,273, filed on Apr. 26, 2016, now Pat. No. 9,507,836, which is a
(Continued)

(51) Int. Cl.
*G06F 17/30* (2006.01)
*H04L 12/58* (2006.01)
*H04L 29/08* (2006.01)

(52) U.S. Cl.
CPC ............. *H04L 51/20* (2013.01); *H04L 67/18* (2013.01); *H04L 67/306* (2013.01)

(58) Field of Classification Search
CPC .................................................. G06F 17/30861
(Continued)

(56) References Cited

U.S. PATENT DOCUMENTS

| 5,603,054 A | 2/1997 | Theimer et al. |
| 6,115,709 A | 9/2000 | Gilmour et al. |

(Continued)

OTHER PUBLICATIONS

Corston-Oliver, Simon et al., "Task-Focused Summarization of Email," Microsoft Research Jul. 2004, (http://www1.cs.columbia.edu/~lokesh/pdfs/Corston.pdf), 8 pages.

(Continued)

*Primary Examiner* — Mahesh Dwivedi
(74) *Attorney, Agent, or Firm* — Middleton Reutlinger

(57) ABSTRACT

Methods and apparatus related to associating an event attribute with a user based on a group of electronic messages associated with the user. An event may be associated with the group of electronic messages. One or more event attributes of the event may be determined, including an event location identifier that identifies a physical event location. One or more of the event attributes may be determined based on the group of electronic messages. Location data of the user may be identified and a likelihood that the user interacted with the physical event location may be determined based on comparing the location data of the user to the event location identifier. The likelihood that the user interacted with the physical event location and at least one of the event attributes determined based on the group of electronic messages may be associated with the user.

20 Claims, 5 Drawing Sheets

Related U.S. Application Data continuation of application No. 14/145,047, filed on Dec. 31, 2013, now Pat. No. 9,342,597.

(58) Field of Classification Search
USPC ............................................... 707/705
See application file for complete search history.

(56) References Cited

U.S. PATENT DOCUMENTS

| | | |
|---|---|---|
| 6,438,543 B1 | 8/2002 | Kazi et al. |
| 6,842,877 B2 | 1/2005 | Robarts et al. |
| 7,496,500 B2 | 2/2009 | Reed et al. |
| 7,702,631 B1 | 4/2010 | Basu et al. |
| 7,813,916 B2 | 10/2010 | Bean |
| 8,046,226 B2 | 10/2011 | Soble et al. |
| 8,055,707 B2 | 11/2011 | Desai et al. |
| 8,108,206 B2 | 1/2012 | Hufnagel et al. |
| 8,364,467 B1 | 1/2013 | Bowman et al. |
| 8,375,099 B2 | 2/2013 | Carroll et al. |
| 8,417,650 B2 | 4/2013 | Graepel et al. |
| 8,521,818 B2 | 8/2013 | McGann et al. |
| 8,560,487 B2 | 10/2013 | Jhoney et al. |
| 8,599,801 B2 | 12/2013 | Baio et al. |
| 8,843,466 B1* | 9/2014 | Zeiger ............... G06F 17/30657 707/706 |
| 9,342,597 B1* | 5/2016 | Tomkins ........... G06F 17/30657 |
| 9,507,836 B1* | 11/2016 | Tomkins ........... G06F 17/30657 |
| 2008/0209011 A1* | 8/2008 | Stremel ................. G06Q 20/20 709/219 |
| 2009/0307212 A1 | 12/2009 | Ramot et al. |
| 2010/0250727 A1* | 9/2010 | King ..................... G01S 5/0027 709/224 |
| 2012/0003989 A1* | 1/2012 | Gravino ............ H04M 3/42357 455/456.1 |
| 2012/0005221 A1 | 1/2012 | Ickman et al. |
| 2012/0030588 A1 | 2/2012 | Sinha |
| 2012/0109942 A1* | 5/2012 | Epshtein ........... G06F 17/30241 707/723 |
| 2012/0143963 A1* | 6/2012 | Kennberg ............ G06Q 10/107 709/206 |
| 2012/0150532 A1 | 6/2012 | Mirowski et al. |
| 2012/0166367 A1* | 6/2012 | Murdock ................ G06Q 30/02 706/12 |
| 2012/0239761 A1 | 9/2012 | Linner et al. |
| 2012/0317499 A1 | 12/2012 | Shen |
| 2012/0331036 A1 | 12/2012 | Duan et al. |
| 2013/0073662 A1 | 3/2013 | Meunier et al. |
| 2013/0159270 A1 | 6/2013 | Urmy et al. |
| 2013/0203383 A1 | 8/2013 | Stopel et al. |
| 2013/0290436 A1 | 10/2013 | Martin et al. |
| 2013/0297551 A1 | 11/2013 | Smith et al. |
| 2014/0188910 A1* | 7/2014 | Miyasato .......... G06F 17/30864 707/752 |
| 2014/0280107 A1* | 9/2014 | Heymans ......... G06F 17/30867 707/727 |

OTHER PUBLICATIONS

Laclavik, et al., "Email Analysis and Information Extraction for Enterprise Benefit," Institute of Informatics, Slovak Academy of Sciences, Slovakia, Computing and Informatics, vol. 30, 2011, pp. 57-87.

Google, Article entitled "Just ask Google for your flights, reservations, package delivery info and more," by Google, date Aug. 14, 2013; 9 pages.

He et al., article entitled "Location Cheating: A Security Challenge to Location-based Social Network Services," Feb. 21, 2011; 10 pages.

* cited by examiner

From: Friend B
To: Friend A, Friend C, User 1
Date: Nov. 26, 2013

240

Pick me up at 4?

> Received on Nov. 26, 2013 at 3:07 P.M.
> From: Friend A
> To: Friend C, Friend B, User 1
> Date: Nov. 26, 2013
>
> 230
>
> Anybody need a ride? Parking's a hassle.
>
>> Received on Nov. 26, 2013 at 1:07 P.M.
>> From: Friend C
>> To: Friend A, Friend B, User 1
>> Date: Nov. 26, 2013
>>
>> 220
>>
>> Sounds good.
>>
>>> Received on Nov. 26, 2013 at 1:05 P.M.
>>> From: Friend A
>>> To: User 1, Friend B, Friend C
>>> Date: Nov. 26, 2013
>>>
>>> 210
>>>
>>> How about Entity B? The food is better.
>>>
>>>> Received on Nov. 25, 2013 at 7:05 P.M.
>>>> From: User 1
>>>> To: Friend A, Friend B, Friend C
>>>>
>>>> 200
>>>>
>>>> Lets tailgate at Restaurant A – meet before the game tomorrow?

FIG. 2

ASSOCIATING AN EVENT ATTRIBUTE WITH A USER BASED ON A GROUP OF ONE OR MORE ELECTRONIC MESSAGES ASSOCIATED WITH THE USER

BACKGROUND

An event may be planned via a group of electronic messages. For example, a group of users may exchange emails related to planning an event.

SUMMARY

The present disclosure is generally directed to methods and apparatus related to associating an event attribute with a user based on a group of electronic messages associated with the user. An event may be associated with the group of electronic messages. One or more event attributes of the event may be determined, including an event location identifier that identifies a physical event location. One or more of the event attributes may be determined based on the group of electronic messages. Location data of the user may be identified. A likelihood that the user interacted with the physical event location may be determined, where the determining may be based on comparing the location data of the user to the event location identifier. The likelihood that the user interacted with the physical event location and at least one of the event attributes determined based on the group of electronic messages may be associated with the user. The association with the user may be stored in one or more databases.

Some implementations are directed to associating the user with one or more additional users associated with the event. Some implementations are directed to utilizing associations stored in one or more databases to identify content responsive to a query, and providing the identified content to the user.

In some implementations a computer implemented method may be provided that includes the steps of: identifying a group of electronic messages associated with a user; identifying an event associated with the group of electronic messages; determining one or more event attributes of the event, where the event attributes include at least an event location identifier identifying a physical event location, where determining the one or more event attributes may include determining at least one of the event attributes based on the group of electronic messages; identifying location data of the user; determining a likelihood that the user interacted with the physical event location, where the determining may be based on comparing the location data of the user to the event location identifier; associating, with the user, the likelihood that the user interacted with the physical event location and at least one of the event attributes determined based on the group of electronic messages; and storing the association with the user in one or more databases.

This method and other implementations of technology disclosed herein may each optionally include one or more of the following features.

In some implementations determining, based on the group of electronic messages, the one or more event attributes may include identifying one or more additional users associated with the event. In some implementations a likelihood that the user interacted with the one or more additional users at the physical event location may be associated with the user. In some implementations associating, with the user, the at least one of the event attributes determined based on the group of electronic messages may include associating, with the user, the one or more additional users. The method may further include identifying additional location data of the one or more additional users, and determining a likelihood that the one or more additional users interacted with the physical event location, where the determining may be based on comparing the additional location data to the event location identifier. In some implementations the method may further include associating, with the one or more additional users, the likelihood that the one or more additional users interacted with the physical event location.

The method may further include receiving a query from the user, utilizing the stored association to identify content responsive to the query, and providing the identified content to the user.

In some implementations the one or more event attributes determined based on the group of electronic messages may include one or more of invitees to the event, likely visitors to the physical event location, a date of the event, a time of the event, a dress code for the event, and a type of event.

In some implementations the group of electronic messages associated with the user may include electronic messages generated by the user.

In some implementations the location data of the user may include data from a locational query issued by the user.

In some implementations the event location identifier of the event attributes may be determined based on the group of electronic messages.

Other implementations may include a non-transitory computer readable storage medium storing instructions executable by a processor to perform a method such as one or more of the methods described herein. Yet another implementation may include a system including memory and one or more processors operable to execute instructions, stored in the memory, to perform a method such as one or more of the methods described herein.

Particular implementations of the subject matter described herein may identify an event associated with a group of electronic messages. Particular implementations of the subject matter described herein may determine one or more event attributes of the event based on the group of electronic messages. Particular implementations of the subject matter described herein may compare location data of a user to an event location identifier of an event to determine a likelihood that the user interacted with an event location. A likelihood that the user interacted with the event location and at least one event attribute of the event attributes may be associated with the user.

It should be appreciated that all combinations of the foregoing concepts and additional concepts discussed in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 2 is a schematic diagram of an example group of electronic messages illustrating identifying an event and determining one or more event attributes based on the example group of electronic messages.

DETAILED DESCRIPTION

Figure 1:
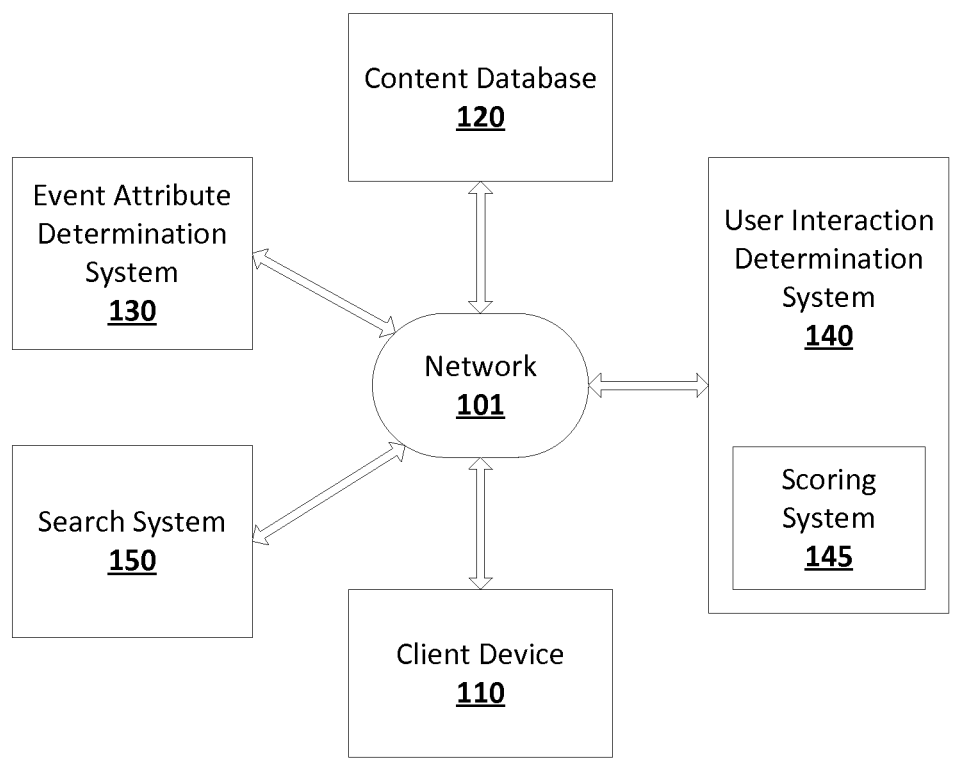
FIG. 1 is a block diagram of an example environment in which an event attribute may be associated with a user based on a group of electronic messages associated with the user.

Technology described herein is useful in associating an event attribute with a user based on a group of electronic messages associated with the user. For example, a dinner may be planned via a group of electronic messages. Based on the group of electronic messages, one or more event attributes of the dinner may be determined. The event attributes may include a date, time, event location, invitees, likely attendees, confirmed attendees, and so forth. For example, the dinner may be planned for Friday, November 30 at 7:00 P.M. at Restaurant A. The user may issue a locational query to Restaurant A at 6:30 P.M. on Friday, November 30. Comparison of the issued locational query to the event location, Restaurant A, may indicate a likelihood that the user interacted with the event location on Friday, November 30 at or about 7:00 P.M. Additional and/or alternative location data of the user may be utilized to determine the likelihood that the user interacted with the event location on Friday, November 30 at or about 7:00 P.M. For example, the user may generate an email, or a post related to user's presence at Restaurant A. Also, for example, the user may access a wireless network associated with Restaurant A via a mobile device. As another example, geolocation data may indicate presence of the user's mobile device at Restaurant A. Also, for example, visit time at Restaurant A may be utilized to determine the likelihood that the user interacted with the event location. The likelihood that the user interacted with the event location and at least one event attribute of the event attributes may be associated with the user. The association may be stored in one or more databases.

In some implementations, event attributes may include one or more additional invitees and/or determined attendees of the dinner. For example, Bob, Susan, John, and Jane may be determined to have attended the dinner. The additional attendees and/or a likelihood that the user interacted with the one or more additional attendees at the dinner at Restaurant A may be associated with the user. For example, "user" may be associated with "Bob", "Susan", "John", "Jane", "Restaurant A", "November 30", "dinner", and so forth. In some implementations such association may be based on determining a likelihood that the one or more additional invitees and/or determined attendees of the dinner interacted with Restaurant A and/or the user. For example, location data associated with Bob may be compared to event location identifiers to determine a likelihood that Bob interacted with Restaurant A and/or the user.

At a future time (e.g., in December), the user may issue a query such as "where did I go to eat with Bob last month?" Based on conventional and/or other searching techniques, the stored association between "user" and "Bob", "Restaurant A", "November 30", and "dinner" may be determined to be relevant to the issued query. For example, the terms "last month" may indicate a date range related to "November 30", the term "Bob" may match "Bob", the term "eat" may be determined to be related to "Restaurant A", etc. In response to determining the stored association is relevant, content related to the stored association may be provided as a search result responsive to the query. For example, "You ate with Bob at Restaurant A on the 30th" may be provided as a search result. As described herein, the association may be stored in one or more databases that may be accessed by a search engine to identify information as relevant to a query and/or to retrieve the information to provide as a search result responsive to a query. For example, an entry may be created in a personal database and/or personal index of the user that maps identifiers for "Bob", "Restaurant A", "November 30", and "dinner" to one another (optionally with scores associated with each of the identifiers).

As another example, the user may issue a query such as "who went for dinner with me and Bob last month?" Based at least in part on the phrase "who went for dinner", the query may be determined to indicate a desire for information related to a restaurant previously visited by the user and Bob. The one or more databases may be accessed to retrieve the stored association between the user and "Bob", "Susan", "John", "Jane", "Restaurant A", "November 30", "dinner". Based at least in part on the term "who", the content responsive to the desire for information may be determined to include "Susan", "John", and "Jane", and such content may be provided to the user.

FIG. 1 illustrates a block diagram of an example environment in which an event attribute may be associated with a user based on a group of electronic messages associated with the user. The example environment includes a communication network 101 that facilitates communication between the various components in the environment. In some implementations the communication network 101 may include the Internet, one or more intranets, and/or one or more bus subsystems. The communication network 101 may optionally utilize one or more standard communications technologies, protocols, and/or inter-process communication techniques. The example environment may also include a client device 110, a content database 120, an event attribute determination system 130, a user interaction determination system 140, a scoring system 145, and a search system 150.

Many other configurations are possible having more or fewer components than the environment shown in FIG. 1. In some implementations the event attribute determination system 130 may include the user interaction determination system 140. In some implementations the event attribute determination system 130 may include the search system 150. In some implementations the user interaction determination system 140 and the scoring system 145 may be separate components of the environment.

The client device 110 may execute one or more applications, such as a web browser. The client device 110 may be, for example, a desktop computer, a laptop, a mobile phone, a computing device of a vehicle of the user (e.g., an in-vehicle communications system, an in-vehicle entertainment system, an in-vehicle navigation system), a wearable apparatus of the user that includes a computing device (e.g., a watch of the user having a computing device, glasses of the user having a computing device). Additional and/or alternative computing devices of the user may be provided.

A group of electronic messages associated with a user may be identified. The electronic messages may include email communications, posts on social networking platforms, instant messages, chats, message board postings, social media postings, and so forth. In some implementations the event attribute determination system 130 identifies the group of electronic messages associated with the user. For example, the user may exchange one or more messages with at least one additional user, where the one or more messages are associated with an event. For example, the user may exchange one or more emails with "Bob" and "Susan" related to attending an alumni reunion. The event attribute determination system 130 may identify the one or more emails as a group of electronic messages associated with the event to "attend an alumni reunion".

In some implementations the user may be identified. For example, the event attribute determination system 130 may identify the user based on a user identification that identifies the user either specifically or generally. For example, the user identification may be an IP address, a geographic region, and/or other information stored in a cookie that is submitted with and/or included with data provided by the client device 110 and/or other component (e.g., an email service). Also, for example, a user may, via client device 110, utilize user credentials to log in to a service (e.g., an email service) and user data that is associated with the service may be provided via client device 110.

In some implementations, a group of electronic messages may be identified by determining associations between the messages of the group such as the messages being part of the same thread, the messages sharing similar recipients, the messages having similar subject lines, the messages having similar terms in bodies of the messages, and/or a relationship of the messages to an event. For example, the group of electronic messages may all be associated with an event based on a user indication such as, for example, the user associating an event entry in a calendar and/or other application with one or more of the messages of the group. For example, the user may create the event entry from one of the messages or otherwise associate one of the messages with the event entry. Also, for example, the event attribute determination system 130 may determine that the group of electronic messages is associated with an event as described herein. In some implementations the messages may be identified, for example, from the content database 120 and/or other component such as a database maintained by a messaging system such as an email database. As another example, the user may exchange one or more messages with a collection of users (e.g., friends, alumni, family, and business associates) and the event attribute determination system 130 may identify the one or more messages as the group of electronic messages based on the collection of users. Also, for example, the user may exchange one or more messages that share a common subject, for example, "trip to Havana", "Mollie's birthday pics", "Friday's concert", and the event attribute determination system 130 may identify the one or more messages as the group of electronic messages associated with the events "trip to Havana", "Mollie's birthday", "Friday's concert", respectively. In some implementations techniques such as contextual analysis, feature extraction, parse trees, and so forth may be utilized to identify common entities and/or concepts in the electronic messages, the electronic messages may be indexed based on such common entities and/or concepts, and the group of electronic messages identified based on such an index. In some implementations one or more of the electronic messages may not be generated by the user. For example, the user may receive one or more messages from additional users. In some implementations the group of electronic messages associated with the user may include electronic messages generated by the user. For example, the user may send an invitation to an event. As another example, the user may respond to an invitation to an event.

An event associated with the group of electronic messages may be identified. In some implementations the event attribute determination system 130 identifies the event. For example, the event may be identified as a "dinner", "concert", "birthday party", "reunion", "anniversary", "wedding", "football game", "trip to Florida", "grocery", "visit the mall", and so forth. In some implementations the event attribute determination system 130 identifies the event based on one or more aspects of the group of electronic messages. For example, the group of electronic messages may share a common subject, such as "dinner", "concert", and "birthday party". In some implementations the event may be extracted from the content of one or more messages in the group of electronic messages. For example, n-grams of one or more of the messages may be utilized to extract features from the one or more messages in the group of electronic messages. Also, for example, parse trees may be associated with the one or more messages in the group of electronic messages, and key terms may be identified based on the parse trees. In some implementations term frequencies of key terms appearing in the one or more messages in the group of electronic messages may be utilized to identify the event. In some implementations term frequency inverse document frequency ("TF-IDF") may be utilized to identify the event. Additional and/or alternative language processing techniques may be utilized to identify the event. For example, key terms and/or key phrases may be identified along with their parts of speech. A parse tree may be determined that links key terms and/or phrases in one or more sentences based on their syntactic and/or semantic relationships.

In some implementations, the event attribute determination system 130 may utilize one or more databases in determining the event. For example, an entity database may be utilized to identify the one or more entities that appear in the group of electronic messages. An entity database may include, for each of a plurality of entities, a mapping (e.g., data defining an association) between the entity and one or more characteristics of the entity and/or other entities related to the entity. In some implementations, entities are topics of discourse. In some implementations, entities are persons, places, concepts, and/or things that can be referred to by a textual representation (e.g., a term or phrase) and are distinguishable from one another (e.g., based on context). In some implementations the entity database may be included in the content database 120.

Based on the group of electronic messages, one or more event attributes of the event may be determined. One or more natural language processing techniques may be optionally utilized to identify the one or more event attributes from the group of messages. For example, the group of electronic messages may be identified as a group of emails that share the subject "Friday's concert". The event attribute determination system 130 may identify a common entity "Mozart" in the group of messages. Based at least in part on the user identification, and the terms "Friday's concert" and "Mozart", the event attribute determination system 130 may access a database such as content database 120 to determine that a concert performance of Mozart's music is scheduled for Friday in the user's geographical location. For example, the content database 120 may include an event database including a list of events that are scheduled in the user's geographical location, and such a list may be additionally annotated with entities associated with the event (e.g., performers, physical location of the event, sponsors, organizers, ticket agencies), and dates and times of the events. The physical location of the concert on Friday may be identified based on such information.

In some implementations the event database may include a database of structured data, such as an event graph, that includes nodes that represent events and identifies the event attributes represented by a node. A node representing an event may also be associated with metadata in the database of structured data (e.g., via links that represent event attributes). Any included metadata may include, for example, names/aliases for the event and/or event location, resources related to the event, descriptive information about the event, among other data.

In some implementations determining, based on the group of electronic messages, the one or more event attributes may include identifying one or more additional users associated with the event. For example, the one or more additional users in a group of email messages associated with the event may be identified based on the identifiers in the email meta data fields, such as fields associated with "To", "Cc", and "Bcc" in the group of email messages. Also, for example, the user may exchange an instant message with "Bob" related to a dinner at Restaurant A. The event attribute determination system 130 may identify "Bob" as an additional user associated with the event.

In some implementations the content database 120 may include a "contacts" database, and the event attribute determination system 130 may utilize the "contacts" database to identify the one or more additional users associated with the event. The "contacts" database may be personal to the user and include, for each additional user, a mapping (e.g., data defining an association) between the additional user and one or more characteristics of the additional user and/or other user related to the additional user. For example, the "contacts" database may include mappings between the additional user and characteristics of the additional user such as names, addresses, email addresses, and telephone numbers associated with each additional user. As another example, the "contacts" database may include identifiers identifying collections of users such as friends, alumni, family, and business associates. The event attribute determination system 130 may identify the group of electronic messages associated with the event, and utilize the "contacts" database to identify the one or more additional users associated with the event.

In this specification, the term "database" will be used broadly to refer to any collection of data. The data of the database does not need to be structured in any particular way, or structured at all, and it can be stored on storage devices in one or more geographic locations. Thus, for example, the content database 120 may include multiple collections of data, each of which may be organized and accessed differently.

In some implementations the one or more event attributes may include, for example, invitees to the event, likely visitors to the event location, a date of the event, a time of the event, a dress code for the event, and/or a type of event. For example, the type of event may be a "business dinner" at an event location characterized as an "upscale restaurant in downtown", with invitees including "firm partners", and a dress code for the event may be "business formal". As another example, the type of event may be a "tailgate party" at an event location identified as "Stadium for Bowl A", and a dress code for the event may be identified as "college colors". Also, for example, the type of event may be a "$40^{th}$ birthday party" at an event location identified as "country club in Jane's subdivision", and a dress code for the event may be identified as "golf attire".

As disclosed herein, in some implementations the event attribute determination system 130 may identify the group of electronic messages associated with the event, and utilize the entity database to identify the one or more event attributes. In some implementations the event attributes may be extracted from the group of messages. For example, the group of messages related to "Friday's concert" may include a time, a date, and a location. In some implementations the time of the event may be determined based on the email messages. For example, the email message may be sent on Tuesday, November 22, and may include the term "this Friday". Based at least in part on such data, the event attribute determination system 130 may determine that the concert is scheduled for Friday, November 25.

In some implementations an event location identifier of the event attributes may be determined, where the event location identifier identifies a physical event location. For example, an event location identifier may include one or more of a physical address of the event location, name of the event location (e.g., Brown Theater), telephone number associated with the event location, GPS coordinates associated with the event location, broadcast name for a Wi-Fi network associated with the event location, and so forth.

In some implementations determining the event location identifier of the event attributes may be based on the group of electronic messages. For example, the user may be planning an event via the group of electronic messages and the event location identifier may be included in one or more of the electronic messages. In some implementations the event attribute determination system 130 may identify one or more entities appearing in the group of email messages and utilize the one or more entities to identify an event location identifier. For example, one or more of the electronic messages may include the term "Brown Theater", and the event attribute determination system 130 may identify the entity associated with "Brown Theater" as an event location identifier.

In some implementations the event database may be utilized to identify event location identifiers. For example, the event location identifiers may be determined based on the event by retrieving the event attributes associated with the event from the event database. For example, the event database may include location data for each of one or more event locations (e.g., museum, theater, concert hall, basketball arena, restaurant, etc.). For example, content database 120 may include location data that is associated with an event location. The information about the event location may include an identifier of the event location such as an address, a latitude and longitude, a zip code, a neighborhood, and/or other identifier. In some implementations the event attributes in the event database may be explicitly indicated as event location identifiers in the event database. In some implementations the entries in the event database may be associated with entries in the entity database. For example, an event "concert" in the event database may be associated with the event location "Brown Theater", in the entity database, and the event location identifier may be identified based on such associations.

In some implementations identifying the event location identifier of the event attributes may not be based on the group of electronic messages. For example, a calendar entry indicative of an upcoming event may be associated with the group of electronic messages and may optionally include an event location identifier. For example, the user may have created the calendar entry from one or more of the messages of the group and/or otherwise associated the calendar entry with the group of electronic messages, and the user may have entered an event location identifier in the calendar entry. The event attribute determination system 130 may identify the event location identifier based on the calendar entry, optionally utilizing the entity database and/or the event database. Also, for example, the event attribute determination system 130 may associate a calendar entry that includes an event location identifier with the group of electronic messages. For example, a calendar entry may indicate that the user is scheduled to go to an upcoming concert at Brown Theater this Friday. Based on the calendar entry, the event attribute determination system 130 may identify a group of email exchanges between the user and one or more additional users that relate to the upcoming concert at Brown Theater this Friday (e.g., based on matching event attributes between the calendar entry and the group of electronic messages). Accordingly, the event attribute determination system 130 may identify "Brown Theater" as an event location identifier. In some implementations the user may be provided with an option to associate the identified group of email exchanges with the calendar entry and/or the event location identifier.

Additional and/or alternative techniques to determine the event location identifier may be utilized. For example, the user may affirmatively select the event location identifier from a list of event location identifiers provided to the user by the event attribute determination system 130. In some implementations the list provided may further include an additional option such as "Other", and allow the user to input an alternative event location. For example, upon selection of "Other", the user may be provided with a user-editable field and prompted to enter the name of the current event location.

In some implementations, based on the group of electronic messages, the event attribute determination system 130 may identify additional and/or alternative names and/or aliases associated with the event location. For example, "Restaurant A" may be additionally and/or alternatively referred to as "the sushi place", "the karaoke joint", "venue of Julie's 25th birthday party", "the Japanese steakhouse I liked", "the restaurant at the corner or Main and $5^{th}$", and so forth.

FIG. 2 is a schematic diagram of an example group of electronic messages illustrating identifying an event and determining one or more event attributes from the example group of electronic messages. As illustrated, message 200 through message 240 may be identified to be a group of email messages. In some implementations the group of electronic messages may be identified based on an exchange between one or more users. For example, message 200, generated by "User 1", as indicated by the "From:" field in message 200, may be the first message in the group of email messages. "User 1" may be the user identification associated with the user. The "To:" field in message 200 indicates that message 200 is sent to "Friend A", "Friend B", and "Friend C". Accordingly, the event attribute determination system 130 may identify the one or more additional users as "Friend A", "Friend B", and "Friend C". The content of message 200 is "Let's tailgate at Restaurant A—meet before the game tomorrow?" The event attribute determination system 130 may utilize language processing techniques to identify the event as "tailgate before the game", and identify the event location as "Restaurant A". Timestamp data associated with message 200 indicates that the message was sent on "Nov. 25, 2013 at 7:05 P.M.". Based at least in part on such data, the event attribute determination system 130 may determine that the term "tomorrow" in message 200 refers to "Nov. 26, 2013", and identify "Nov. 26, 2013" as an event attribute. Additional and/or alternative event attributes may be identified as event attributes. For example, the group of electronic messages may refer to "wear your colors", and based at least in part on the type of event (e.g., tailgate party) at an event location identified as "Restaurant A", the event attribute determination system 130 may identify a dress code for the event as "college colors" associated with "University A".

Additionally, the event attribute determination system 130 may access content database 120 to identify the games scheduled to take place on Nov. 26, 2013 in a geographic region associated with User 1. In some implementations additional information may be utilized to determine the "game" referred to in message 200. For example, content database 120 may store information related to user interest in a particular sport, user association with alumni associations, recent purchase of sports related merchandise, and so forth. In some implementations additional user identification may include user preference for data related to sports teams followed by the user, and such data may be forwarded by a mobile device of the user. Also, for example, additional user identification may include a recent ticket purchase by user 1, Friend A, Friend B and/or Friend C, for a basketball game on Nov. 26, 2013, and the "game" referred to in message 200 may be identified as the basketball game on Nov. 26, 2013.

Message 210 is generated by Friend A in response to message 200 generated by User 1. Accordingly, message 210 may be included in the group of electronic messages associated with User 1. Based at least in part on the content of message 210, "How about Entity B", the event attribute determination system 130 may change the event location from "Restaurant A" to "Entity B". In some implementations the event attribute determination system 130 may identify both "Restaurant A" and "Entity B" as potential event locations.

Message 220 is generated by Friend C in response to messages 210. Accordingly, message 220 may be included in the group of electronic messages associated with User 1, based in part on the determination that message 210 is included in the group of electronic messages. Based at least in part on the content of message 220, "Sounds good", the event attribute determination system 130 may change "Entity B" from a potential event location to the identified event location. In some implementations based on Friend C's confirmation (in message 220) of Friend A's suggestion for a change of event location (in message 210), the event attribute determination system 130 may change "Entity B" from a potential event location to the identified event location associated with Friend A and Friend C, and may identify both "Restaurant A" and "Entity B" as potential event locations associated with Friend B and User 1, based at least in part on a lack of confirmation of the event location by Friend B and User 1.

Message 230 is generated by Friend A in response to message 220. Accordingly, message 220 may be included in the group of electronic messages associated with User 1, based in part on the determination that message 220 is included in the group of electronic messages. Likewise, message 240 is generated by Friend B in response to message 230, and may be included in the group of electronic messages associated with User 1. In message 240, Friend B asks "Pick me up at 4?" in response to Friend A's suggestion for a ride as indicated by message 230: "Anybody needs a ride?" Based on contextual and/or other language processing techniques, the event attribute determination system 130 may process the exchange of messages 230 and 240 as an affirmation of Friend B's desire to change the event location from "Restaurant A" to "Entity B". In some implementations, based on Friend B's confirmation (in message 240) of Friend A's suggestion for a change of event location (in message 210), the event attribute determination system 130 may change "Entity B" from a potential event location to the identified event location associated with Friend A, Friend B, and Friend C, and may identify both "Restaurant A" and "Entity B" as potential event locations associated with User 1, based at least in part on a lack of confirmation of the event location by User 1. Location data of User 1 may indicate that User 1 is at Entity B on Nov. 26, 2013. Based on such data, the event attribute determination system 130 may change "Entity B" from a potential event location to the identified event location associated with User 1, Friend A, Friend B, and Friend C.

As described herein, the event attribute determination system 130 may identify location data of the user. In some implementations location data may specify a location in the form of latitude, longitude pair. In some implementations location data may specify a location in the form a textual address, for example, "1234 Example Road, City, KY 48765" or "Example Restaurant 98765". In some implementations location data may specify a location in the form of multiple potential locations in a radius or other area of potential locations. For example, location data may specify a plurality of coordinates and indicate that the assumed location is within an area defined by the plurality of coordinates. Additional and/or alternative forms of location data may be utilized. In some implementations location data for a visit to an event location for the user may include, for example, data indicative of: a date, day of the week, time, and/or time duration of actual and/or indicated visits of the user to the location, and/or visit duration time of the visit at the event location. In some implementations additional location data of the one or more additional users may be identified utilizing the techniques described herein. For example, location data may be received via one or more databases, such as one or more databases that are personal to the user.

In some implementations location data may be based on at least one of cellular tower signals and Wi-Fi signals. For example, a visit to an event location may be identified at least in part from cellular tower signals providing network connectivity to the mobile phone as the user visits the event location with the mobile phone. As another example, the user may access a Wi-Fi network at the event location, and this may indicate presence at the event location. In some implementations location data may be provided by the client device 110 at certain time intervals as the user moves with the client device 110. In some implementations any location data may not be tethered to the identity of individual users and may not be traceable to a specific user. For example, in some implementations location data associated with a location may only be accessible when at least a threshold number of users have navigated to the location. Any location data identified from a mobile phone or other electronic devices may not be identifiable to a specific user. In some implementations location data may include data that represents a summary of actual and/or indicated visits from a plurality of users.

In some implementations location data may include data from a locational query issued by the user. A locational query may include a query issued via a mapping application and/or other application that seeks location information related to an entity. For example, the user may issue a locational query of "Restaurant A" via a mapping application, such as a web-based mapping application. The mapping application may identify one or more search results for Restaurant A and provide a map to the user that displays the geographic location of one or more of the search results on the map. For example, a single search result for "Restaurant A" may be identified and an indicator of the geographic location of Restaurant A may be displayed on a map.

Locational queries may additionally and/or alternatively include directional locational queries that seek active and/or static directions to an event location via a mapping service. Directional locational queries may be issued by the user to one or more mapping services. Active directional locational queries seek active directions to a location. For example, a user may submit an active directional locational query by providing the address of an event location via a navigation device equipped with GPS and/or other locational capabilities and may receive active turn-by-turn directions to the event location. Static directional locational queries seek non-active directions to a location, such as via a map-based service. For example, upon searching for Restaurant A, the user may be provided with a suggested static directional locational query, such as a selectable option to "Get Directions" to Restaurant A. Upon selecting the option to receive directions to Restaurant A, the user may be provided with a map showing one or more directional paths from the user's location of choice to Location A. As referred to herein, an online "selection" of an option or a service may include, for example a mouse-click, a click-through, a voice-based selection, a selection by a user's finger on a presence-sensitive input mechanism (e.g., a touch-screen device), and/or any other appropriate selection mechanism.

Additional and/or alternative location data may be utilized. For example, location data of the user may include, for example, one or more of navigational queries to a physical location (e.g. directional navigation queries, active navigational queries), financial transactions at the physical location, user comments on a social platform related to the physical location, user selection of location services related the physical location, affirmative user responses to a query requesting affirmation of location data associated with the physical location, data from a user's search history and/or browsing history, and so forth.

A likelihood that the user interacted with the physical event location may be determined, the determining based on comparing the location data of the user to the event location identifier. In some implementations the user interaction determination system 140 may compare the location data of the user to the event location identifier to determine the likelihood that the user interacted with the event location. In some implementations the determined likelihood may be binary. For example, the user interaction determination system 140 may determine a likelihood that either indicates the user interacted with the event location or that the user did not interact with the event location. In some implementations the determined likelihood may be non-binary. For example, the user interaction determination system 140 may determine a likelihood that is a value between 0 and 1, with lower values indicating less likelihood of interaction and higher values indicating higher likelihood of interaction. In some implementations the scoring system 145 may determine the non-binary values associated with the determined likelihood.

In some implementations, the user interaction determination system 140 may determine that the user interacted with the event location if the likelihood satisfies a threshold. In some implementations, the likelihood may be based on the number of the location data of the user that match the event location identifiers, and the threshold may be a threshold number of matches. For example, if data related to a locational query issued by the user and Wi-Fi access data associated with a mobile device of the user match the event location identifiers, then the user interaction determination system 140 may associate a higher likelihood that the user interacted with the event location, than if the locational query issued by the user match an event location identifier. In some implementations, based on techniques described herein, the additional location data may be compared to the event location identifier to determine a likelihood that the one or more additional users interacted with the event location.

The term "match" as used herein, includes exact matching and/or soft matching. For example, the user interaction determination system 140 may match n-grams of event location identifiers and location data of the user by stemming one or more terms of the n-grams, rearranging terms of the n-grams, etc. Also, for example, the user interaction determination system 140 may determine an event location identifier and a location data of a user match if they are within a threshold distance of one another.

In some implementations, whether location data of the user matches the event location identifier may be based on a time duration associated with the location data. For example, location data that indicates presence of a user at an event location may include duration information related to the duration of the visit. In some implementations the location data that indicates presence of a user at an event location may only be determined to match an event location identifier if the duration information satisfies a threshold (e.g., 50 minutes at a restaurant). In some implementations the location data may include, or be associated with a visit duration that must be achieved to determine a match. For example, a location data for a coffee shop may be associated with visit duration of greater than one minute, whereas a location data for a restaurant may be associated with visit duration of greater than fifteen minutes.

In some implementations the likelihood of interaction with an event location may be based on a quantity of the event location identifiers that match the location data of the user. For example, two matching event location identifiers may be more indicative of a likelihood that the user interacted with the event location than just one matching event location identifier. In some implementations the likelihood may be based on a quantity of the one or more event location identifiers that match the location data, as compared to the total number of event location identifiers. For example, two matching event location identifiers out of five total may be more indicative of a likelihood the user interacted with the event location than two matching event location identifiers out of ten total.

In some implementations the likelihood may additionally be based on any weighting optionally associated with the matching event location identifiers. For example, as described herein, some event location identifiers may be associated with a weighting or score that is indicative of likelihood that the event location identifiers indicates interaction with the event location. For example, in some implementations a higher score may be more indicative of interaction with the event location than a lower score. Accordingly, a first event location identifier that is associated with a greater score than a second matching event location identifier may influence the likelihood more strongly than the second event location identifier. For example, if the first event location identifier is the only matching event location identifier, interaction with the event location may be determined; whereas if the second event location identifier is the only matching event location identifier, interaction with the event location may not be determined. In some implementations the scoring system 145 may determine the weighting and/or score associated with the event location identifiers.

In some implementations the likelihood may additionally be based on any weighting optionally associated with the location data that matches event location identifiers. For example, some location data may be associated with a weighting or score that is indicative of likelihood that the location data indicates interaction with the event location. For example, in some implementations location data that is based on a measured location of a user (e.g., GPS based data) may be associated with a greater weighting than location data that is based on a post of a user on a social networking platform.

In some implementations the likelihood may additionally be based on the degree of the matching between the matching event location identifiers and the location data. For example, exact matches may be weighted more heavily than "soft" matches. Also, for example, "soft" matches may be weighted based on how far away from an exact match they are. In some implementations the likelihood may additionally be based on the time duration associated with the location data matching the event location identifiers. For example, location data that indicates presence of a user at an event location for fifty minutes may be weighted more heavily than location data that indicates presence of a user at an event location for only two minutes. One or more techniques described herein to determine the likelihood that the user interacted with the event location may be optionally combined. For example, a linear combination of the one or more techniques described herein may be utilized to determine the likelihood.

As described herein, the user may be associated with a likelihood that the user interacted with the one or more additional users at the event location. In some implementations such likelihood may be based on the likelihood that the user interacted with the event location and the likelihood that the one or more additional users interacted with the event location. For example, if there is a high likelihood that the user interacted with the event location and a high likelihood that an additional user interacted with the event location, then the user interaction determination system 140 may determine that there is a high likelihood that the user interacted with the additional user at the event location. Likewise, if there is a low likelihood that the user interacted with the event location and a low likelihood that an additional user interacted with the event location, then the user interaction determination system 140 may determine that there is a low likelihood that the user interacted with the additional user at the event location. Also, for example, if there is a high likelihood that the user interacted with the event location and a medium likelihood that an additional user interacted with the event location, then the user interaction determination system 140 may determine that there is a medium likelihood that the user interacted with the additional user at the event location. In some implementations the scoring system 145 may associate scores with the likelihood that the user interacted with the event location and the likelihood that the one or more additional users interacted with the event location, and the likelihood that the user interacted with the one or more additional users may be based on a combination of the associated scores. In some implementations the associated scores may be weighted to determine the likelihood that the user interacted with the one or more additional users at the event location.

Additional and/or alternative techniques may be utilized to determine the likelihood that the user interacted with the one or more additional users at the event location. For example, location data of the user may be compared to the location data of the one or more additional users to determine the likelihood that the user interacted with the one or more additional users at the event location. As described herein, the determined likelihood may be binary, non-binary, may be based on time duration associated with the respective location data, the number of matches between the respective location data, a weighting of the respective location data, and so forth.

For example, if GPS coordinates of respective mobile devices of the user and the one or more additional users indicate matching location data at a given time, and the location data matches with the event location identifier, then there is a high likelihood that the user interacted with the one or more additional users at the event location. On the other hand, if the location data of the user indicates that the user is at the event location and the location data of an additional user indicates that the additional user is at a location different from the event location, then there is a low likelihood that the user interacted with the additional user at the event location. As another example, if social posts issued by the user and the one or more additional users indicate a visit to the event location at the same time, then there is a high likelihood that the user interacted with the one or more additional users at the event location. On the other hand, if the social post of the user indicates that the user is at the event location and the social post of an additional user indicates that the additional user is at a location different from the event location, then there is a low likelihood that the user interacted with the additional user at the event location.

Figure 3:
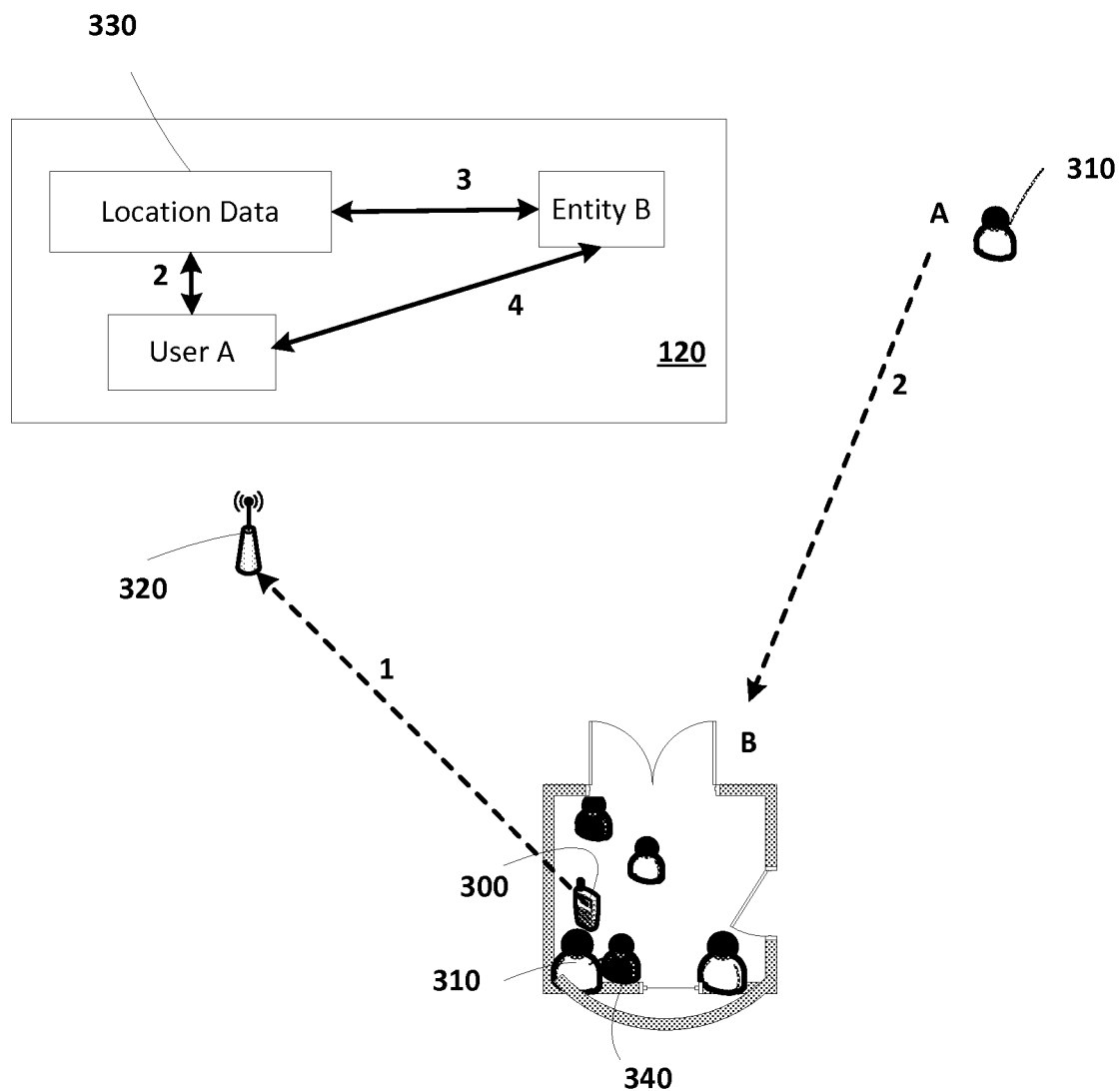
FIG. 3 is a schematic diagram that provides a general overview of an example comparison of location data of a user to an event location identifier to determine a likelihood that the user interacted with the event location.

FIG. 3 is a schematic diagram that provides a general overview of an example to determine a likelihood that the user interacted with the physical event location, the determining based on comparing the location data of the user to the event location identifier. User 310 may be visiting entity B. Entity B may be associated with an event location. In some implementations a wireless access point 320 may be utilized to identify location data for the user 310 via a mobile phone 300 of the user 310. For example, the mobile phone 300 may communicate with the wireless access point 320 and may provide data related to the wireless access point 320 as location data. Also, for example, the wireless access point 320 may communicate with the mobile phone 300 and may provide data related to the mobile phone 300 and the wireless access point 320 as location data. The wireless access point 320 may be, for example, a Wi-Fi network and/or a cellular tower. The identified location data is generally indicative of a geographic location of the mobile phone 300 and may be based on signal 1 from the mobile phone 300. In some implementations the identified location data may be based on signal 1 from client device 110. In some implementations signal 1 may include GPS data from a GPS device of the client device 110. In some implementations a database such as content database 120 may include a repository of associations between entities and location data. Each location data may be associated with one or more entities in the content database 120.

For example, a dinner may be planned for Friday, November 30 at 7:00 P.M. at Entity B. The user 310 may issue a directional locational query at 6:30 P.M. on Friday, November 30, from location A to visit entity B and subsequently arrive at entity B. Location data of the user may be identified via the mobile phone 300 (e.g., provided directly to the user interaction determination system 140 and/or stored in content database 120 and later retrieved by the user interaction determination system 140). Based at least in part on such data, an association 2 between the User A and the location data may be determined. Event attribute determination system 130 may access content database 120 to match the location data identified via the mobile phone 300 with a stored entry in the content database 120, such as location data 330. Exact matching and/or soft matching between the location data identified via the mobile phone 300 and the location data 330 may be utilized to associate User A with Location Data 330 via an association 2 in the content database 120. The event attribute determination system 130 may further identify the association 3 between location data 330 and Entity B. Based on associations 2 and 3, the event attribute determination system 130 may further determine an association 4 between the User A and the event location Entity B. Association 4 indicates the likelihood that the user interacted with Entity B on Friday, November 30 at or about 7:00 P.M. Such likelihood may be determined based on matching event location identifiers with location data of the user. For example, the user may generate an email, or a post related to user's presence at Entity B. Also, for example, the user may access a wireless network associated with Entity B via a mobile device. As another example, geolocation data may indicate presence of the user's mobile device at Entity B. Also, for example, visit time at Entity B may be utilized to determine the likelihood that the user interacted with Entity B.

Also, for example, with reference to FIG. 3, GPS coordinates of respective mobile devices of user 310 and additional user 340 may indicate matching location data on Friday, November 30 at or about 7:00 P.M. at Entity B. Accordingly, the user interaction determination system 140 may determine that there is a high likelihood that the user 310 interacted with the additional user 340 at Entity B on Friday, November 30 at or about 7:00 P.M.

The likelihood that the user interacted with the physical event location, and at least one of the event attributes may be associated with the user. For example, an entry associated with the user may include an identifier of the likelihood and an identifier of at least one of the event attributes. For example, in implementations where the likelihood is a binary "true" or "false", the entry may include an identifier of the likelihood that indicates the physical event location was visited by the user. In some implementations, the at least one of the event attributes associated with the user may include one or more event attributes determined based on the group of electronic messages. As an example, the event determination system 130 may determine the user attended the dinner at Entity B and may also determine one or more additional users "Bob", "Susan", "John", and "Jane" that are associated with the event. The likelihood that the user interacted with Entity B and the additional users may be associated with the user. For example, an entry of the user may include an identifier that the user visited "Entity B", and identifiers of "Bob", "Susan", "John", and "Jane".

In some implementations the user interaction determination system 140 associates the determined likelihood that the user interacted with the event location and the one or more event attributes with the user. For example, the user interaction determination system 140 may update a status identifier of the event to reflect the determined likelihood that the user interacted with the event location and/or to reflect that the user and/or the one or more additional users interacted with the event location. Likewise, the likelihood that an additional user interacted with the event location may be associated with a given additional user of the one or more additional users. The association with the user, of the likelihood that the user interacted with the event location and the one or more event attributes, may be stored in one or more databases. Likewise, the association, with an additional user of the one or more additional users, of the likelihood that the additional user interacted with the event location, may be stored in the one or more databases.

As described herein, in some implementations the associated one or more event attributes may include identifiers of one or more additional users. For example, one or more additional users may be extracted from the email meta data from a group of email messages. As another example, additional users may be extracted from posts between the user and the one or more additional users on a social networking platform.

As described herein, in some implementations the content database 120 may include the event database that includes structured data, such as an event graph, that includes nodes that represent events and identifies the event attributes represented by a node. In some implementations an event may be associated with the user and/or the one or more additional users "Bob", "Susan", "John", and "Jane". In some implementations such associations may be additionally annotated with the respective likelihoods as described herein. For example, the event "Friday's concert" may be represented by a first node. The first node may be linked to a second node representing the user and to a third node representing the additional user "Bob". The link between the first and second nodes may be annotated with the determined likelihood that the user interacted with the event location; the link between the first and third nodes may be annotated with the determined likelihood that Bob interacted with the event location; and the link between the second and third nodes may be annotated with the determined likelihood that the user interacted with Bob at the event location.

In some implementations the user may be associated with the one or more additional users associated with the event. For example, as described herein, the one or more additional users in a group of email messages associated with the event may be identified based on the identifiers in the email meta data fields, such as fields associated with "To", "Cc", and "Bcc" in the group of email messages. Additionally, the user interaction determination system 140 may determine that the user interacted with the physical event location, and based on the email meta data fields in the group of email messages associated with the event and the user, the event attribute determination system 130 may associate the additional users with user and the physical event location. Additional and/or alternative techniques may be utilized to associate the additional users with the user and the physical event location. For example, the user may exchange a calendar entry with "Bob" related to a dinner at Restaurant A. Bob may generate an electronic message to the user confirming his dinner appointment. The user interaction determination system 140 may determine that the user interacted with Restaurant A, and based on Bob's electronic message, the event attribute determination system 130 may associate the user with "Bob", and "Restaurant A".

In some implementations the stored associations may be specific to the user. For example, the associations between the user, the one or more event attributes, and the likelihood that the user interacted with the event location and/or one or more event attributes may be stored in a database with access restrictions that only enable access by the user and/or one or more other users authorized by the user.

In some implementations a query may be received from the user. For example, the user may issue a query such as "where did I go to eat with Bob last month?" In some implementations one or more query features associated with the query may be extracted. For example, the query may be associated with a time stamp indicating December as the month when the query is issued. Also, for example, "user", "go", "eat", "Bob", "last month" may be additional query features that may be extracted from the query. Based at least in part on the query feature "last month", the event attribute determination system 130 may identify "November" as the entity "last month" referred to in the query.

Stored associations of the user with likelihoods that the user interacted with a physical event location and one or more event attributes may be determined to be relevant for the issued query. For example, a stored entry in a database and/or index personal to the user may map identifiers for "Entity B", "Bob", and "November 30" to one another (optionally with scores associated with each of the identifiers). The entry may further identify a likelihood that the user interacted with Entity B. For example, the entry may include a determined probability the user interacted with Entity B, a status identifier indicating the user interacted with Entity B, and/or other identifier indicating the entry is related to a location likely interacted with by the user. Based on conventional and/or other searching techniques, the stored entry may be determined to be relevant to the issued query. In response to determining the stored entry is relevant, content related to the stored entry may be provided as a search result responsive to the query. For example, "You ate with Bob at Entity B on the 30th" may be provided as a search result.

In some implementations the search system 150 may receive one or more queries issued by the user through one or more client devices 110. The search system 150 may access the content database 120 of stored associations between the user and the one or more event attributes. The client device 110, the content database 120, the event attribute determination system 130, the user interaction determination system 140, the scoring system 145, and/or the search system 150, may each include memory for storage of data and software applications, a processor for accessing data and executing applications, and components that facilitate communication over the communication network 101. The client devices 110 may execute applications, such as web browsers, that allow users to formulate queries and submit them to the search system 150. Based on the query, the search system 150 may identify content responsive to the query and provide the identified content to the user. For example, in response to a query from the client device 110, the search system 150 may provide a search results web page to be displayed in the web browser executing on the client device 110. The content database 120, the event attribute determination system 130, the user interaction determination system 140, the scoring system 145, and/or the search system 150, may be implemented in hardware, firmware, and/or software running on hardware. For example, one or more of the systems may be implemented in one or more computer servers.

In some implementations users may interact with the event attribute determination system 130 through one or more client devices 110. For example, the search system 150 may receive one or more queries issued by the user and may provide the one or more queries to the event attribute determination system 130. The event attribute determination system 130 may determine that the query indicates a desire for information related to a physical location previously interacted with by the user, and may access content database 120 to match the physical location to at least one of the past event location and the one or more past event attributes previously interacted with by the user. The event attribute determination system 130 may retrieve content responsive to the desire for information and provide such content to the search system 150. Based at least in part on such content, the search system 150 may respond by generating search results that are provided to the one or more client devices 110 in a form that can be presented to the users.

Figure 4:
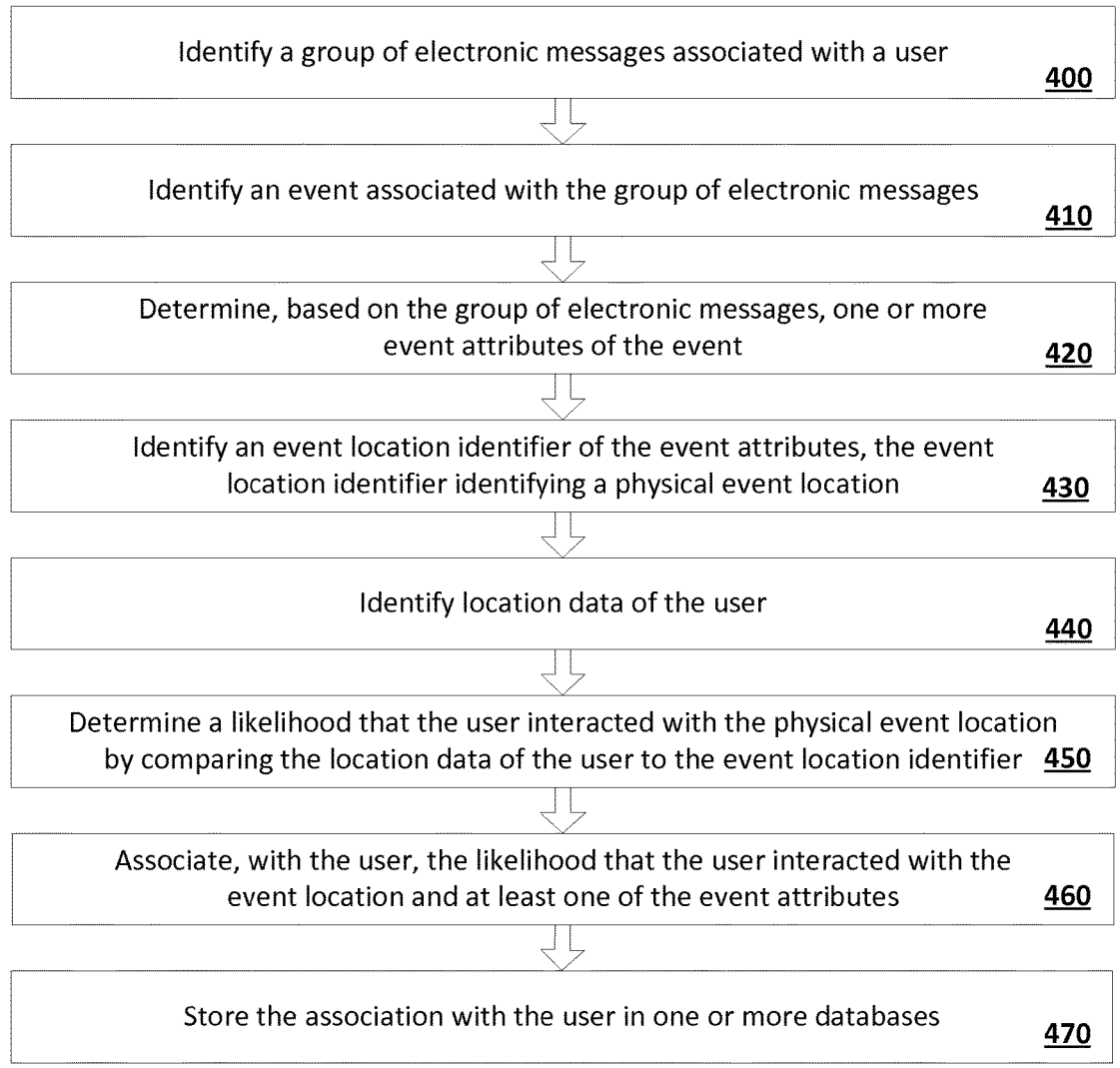
FIG. 4 is a flow chart illustrating an example method of associating an event attribute with a user and a group of electronic messages associated with the user.

Referring to FIG. 4, a flow chart illustrates an example method of associating an event attribute with a user based on a group of electronic messages associated with the user. Other implementations may perform the steps in a different order, omit certain steps, and/or perform different and/or additional steps than those illustrated in FIG. 4. For convenience, aspects of FIG. 4 will be described with reference to a system of one or more computers that perform the process. The system may include, for example, the event attribute determination system 130, the user interaction determination system 140, the scoring system 145, and/or the search system 150 of FIG. 1.

At step 400, a group of electronic messages associated with a user may be identified. A group of electronic messages associated with a user may be identified. In some implementations the event attribute determination system 130 identifies the group of electronic messages associated with the user. For example, the user may exchange one or more messages with at least one additional user, where the one or more messages are associated with an event. For example, the user may exchange one or more emails with "Bob" and "Susan" related to attending an alumni reunion. The event attribute determination system 130 may identify the one or more emails as a group of electronic messages associated with the event to "attend an alumni reunion".

In some implementations the event attribute determination system 130 may identify the user based on a user identification that identifies the user either specifically or generally. For example, the user identification may be an IP address, a geographic region, and/or other information stored in a cookie that is submitted with and/or included with data provided by the client device 110 and/or other component (e.g., an email service). Also, for example, a user may, via client device 110, utilize user credentials to log in to a service (e.g., an email service) and user data that is associated with the service may be provided via client device 110.

At step 410, an event associated with the group of messages may be identified. In some implementations, identification of an event associated with the group of messages may include identifying a title, event type, or other identifier associated with the event. In some implementations, identifying an event associated with the group of messages may include identifying the group of messages to be associated with an event generally. Identifying the group of messages to be associated with an event may be based on the messages themselves and/or other source (e.g., a calendar entry linked to one or more of the messages). In some implementations the event attribute determination system 130 identifies the event. For example, the event may be identified as a "dinner", "concert", "birthday party", "reunion", "anniversary", "wedding", "football game", "trip to Florida", "grocery", "visit the mall", and so forth. In some implementations the event attribute determination system 130 identifies the event based on one or more aspects of the group of electronic messages. For example, the group of electronic messages may share a common subject, such as "dinner", "concert", and "birthday party".

At step 420, one or more event attributes of the event may be determined based on the group of electronic messages. One or more natural language processing techniques may be optionally utilized to identify the one or more event attributes from the group of messages. For example, the group of electronic messages may be identified as a group of emails that share the subject "Friday's concert". The event attribute determination system 130 may identify a common entity "Mozart" in the group of messages. Based at least in part on the user identification, and the terms "Friday's concert" and "Mozart", the event attribute determination system 130 may access a database such as content database 120 to determine that a concert performance of Mozart's music is scheduled for Friday in the user's geographical location. For example, the content database 120 may include an event database including a list of events that are scheduled in the user's geographical location, and such a list may be additionally annotated with entities associated with the event (e.g., performers, physical location of the event, sponsors, organizers, ticket agencies), and dates and times of the events. The physical location of the concert on Friday may be identified based on such information.

In some implementations determining the one or more event attributes may further include identifying one or more additional users associated with the event. For example, the one or more additional users in a group of email messages associated with the event may be identified based on the identifiers in the data fields associated with "To", "Cc", and "Bcc" in the group of email messages. In some implementations the one or more event attributes may include invitees to the event, likely visitors to the event location, a date of the event, a time of the event, a dress code for the event, and/or a type of event.

At step 430, an event location identifier of the event attributes may be identified, the event location identifier identifying a physical event location. For example, the event location identifiers may include a physical address of the event location, a name of the event location (e.g., Brown Theater), a telephone number associated with the event location, GPS coordinates associated with the event location, a broadcast name for a Wi-Fi network associated with the event location, and so forth.

In some implementations the event location identifier may be identified based on the group of electronic messages. For example, the group of electronic messages may be identified as a group of emails that share the subject "dinner". The event attribute determination system 130 may identify a common entity "Entity B" in the group of messages. Based at least in part on the user identification, and the terms "dinner" and "Entity B", the event attribute determination system 130 may access a database such as content database 120 to determine that a dinner is scheduled at Entity B.

In some implementations identifying the event location identifier of the event attributes may not be based on the group of electronic messages. For example, a calendar entry indicative of an upcoming event may be associated with the group of electronic messages and may optionally include an event location identifier. The event attribute determination system 130 may identify the event location identifier based on the calendar entry. Also, for example, the event attribute determination system 130 may associate a calendar entry that includes an event location identifier with the group of electronic messages. For example, a calendar entry may indicate that the user is scheduled to go to an upcoming concert at Brown Theater this Friday. Based on the calendar entry, the event attribute determination system 130 may identify a group of email exchanges between the user and one or more additional users that relate to the upcoming concert at Brown Theater this Friday (e.g., based on matching event attributes between the calendar entry and the group of electronic messages). Accordingly, the event attribute determination system 130 may identify "Brown Theater" as an event location identifier.

At step 440, location data of the user may be identified. In some implementations location data may specify a location in the form of latitude, longitude pair. In some implementations location data may specify a location in the form a textual address, for example, "1234 Example Road, City, KY 48765" or "Example Restaurant 98765". In some implementations location data may specify a location in the form of multiple potential locations in a radius or other area of potential locations. For example, location data may specify a plurality of coordinates and indicate that the assumed location is within an area defined by the plurality of coordinates. Additional and/or alternative forms of location data may be utilized. In some implementations location data for a visit to an event location for the user may include, for example, data indicative of: a date, day of the week, time, and/or time duration of actual and/or indicated visits of the user to the location, and/or visit duration time of the visit at the event location. In some implementations additional location data of the one or more additional users may be identified utilizing the techniques described herein. For example, location data may be received via one or more databases, such as one or more databases that are personal to the user.

At step 450, a likelihood that the user interacted with the event location may be determined by comparing the location data of the user to the event location identifier. In some implementations the user interaction determination system 140 may compare the location data of the user to the event location identifier to determine the likelihood that the user interacted with the event location. In some implementations the determined likelihood may be binary. For example, the user interaction determination system 140 may determine a likelihood that either indicates the user interacted with the event location or that the user did not interact with the event location. In some implementations the determined likelihood may be non-binary. For example, the user interaction determination system 140 may determine a likelihood that is a value between 0 and 1, with lower values indicating less likelihood of interaction and higher values indicating higher likelihood of interaction. In some implementations the scoring system 145 may determine the non-binary values associated with the determined likelihood. In some implementations, the user interaction determination system 140 may determine that the user interacted with the event location if the likelihood satisfies a threshold.

At step 460, the likelihood that the user interacted with the event location and at least one of the event attributes may be associated with the user. For example, an entry associated with the user may include an identifier of the likelihood and an identifier of at least one of the event attributes. For example, in implementations where the likelihood is a binary "true" or "false", the entry may include an identifier of the likelihood that indicates the physical event location was visited by the user. In some implementations, the at least one of the event attributes associated with the user may include one or more event attributes determined based on the group of electronic messages. As an example, the event determination system 130 may determine the user attended the dinner at Entity B and may also determine one or more additional users "Bob", "Susan", "John", and "Jane" that are associated with the event. The likelihood that the user interacted with Entity B and the additional users may be associated with the user. For example, an entry of the user may include an identifier that the user visited "Entity B", and identifiers of "Bob", "Susan", "John", and "Jane".

In some implementations the user interaction determination system 140 associates the determined likelihood that the user interacted with the event location and the one or more event attributes with the user. For example, the user interaction determination system 140 may update a status identifier of the event to reflect the determined likelihood that the user interacted with the event location and/or to reflect that the user and/or the one or more additional users interacted with the event location.

At step 470, the association with the user may be stored in one or more databases. For example, the association may be stored as an entry in a database and/or index personal to the user that maps identifiers for event attributes to one another (optionally with scores associated with each of the identifiers). The entry may further identify a likelihood that the user interacted with an event location associated with the entry. For example, the entry may include a determined probability the user interacted with the event location, a status identifier indicating the user interacted with the event location, and/or other identifier indicating the entry is related to a location likely interacted with by the user. As another example, the association may be stored as mapped nodes that each represents an event and/or one or more event attributes. Links between the nodes may identify an association of the nodes and the nodes, and/or the links between the nodes, may optionally be annotated with one or more scores and/or other data. For example, the node associated with an event may be annotated with information related to the determined likelihood that the user interacted with the event location.

Figure 5:
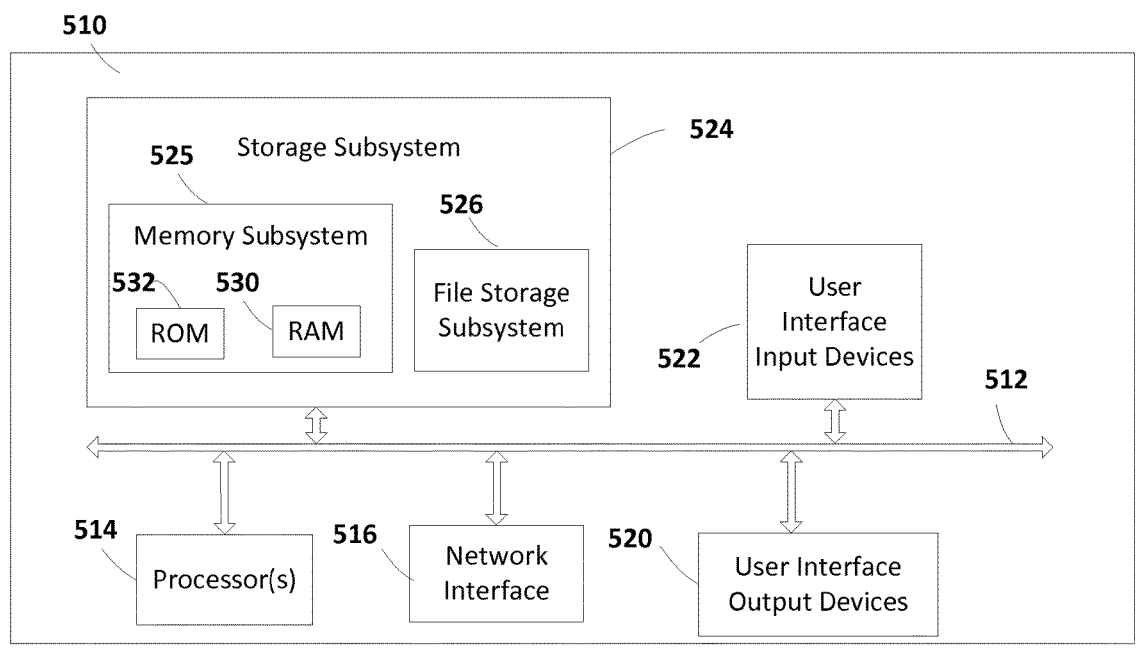
FIG. 5 illustrates a block diagram of an example computer system.

FIG. 5 is a block diagram of an example computer system 510. Computer system 510 typically includes at least one processor 514 which communicates with a number of peripheral devices via bus subsystem 512. These peripheral devices may include a storage subsystem 524, including, for example, a memory subsystem 525 and a file storage subsystem 526, user interface input devices 522, user interface output devices 520, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to determine an event location identifier identifying a physical location of the event. As another example, the storage subsystem 524 may include the logic to compare location data of the user and the event location identifiers.

These software modules are generally executed by processor 514 alone or in combination with other processors. Memory 525 used in the storage subsystem can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be optionally stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer implemented method, comprising:
   identifying one or more electronic messages associated with a user;
   identifying an event associated with the electronic messages;
   determining one or more event attributes of the event, the event attributes including at least one event location identifier identifying a physical event location, wherein determining the one or more event attributes includes determining, based on the event being associated with the electronic messages, at least one of the event attributes based on at least one of the electronic messages;
   storing, in association with the user in one or more databases:
      an association of the event location identifier with the at least one of the event attributes determined based on the at least one of the electronic messages;
   receiving a query that includes a plurality of terms;
   identifying the event location identifier is relevant to the query based on determining that at least one of the terms matches the at least one of the event attributes having the stored association with the event location identifier; and
   providing, in response to the query and based on identifying the event location identifier is relevant to the query, content that is based on the event location identifier.

2. The method of claim 1, wherein the at least one of the event attributes determined based on the at least one of the electronic messages includes one or more additional users associated with the event; and
   wherein the association of the event location identifier with the at least one of the event attributes includes an association of the event location identifier with the one or more additional users associated with the event.

3. The method of claim 2, wherein determining that the at least one of the terms matches the at least one of the event attributes having the stored association with the event location identifier includes:
   determining that the at least one of the terms matches at least one of the additional users of the one or more additional users associated with the event.

4. The method of claim 2, further comprising:
   determining that the one or more additional users interacted with the physical event location;
   wherein storing the association of the event location identifier with the one or more additional users associated with the event is based on determining that the one or more additional users interacted with the physical event location.

5. The method of claim 1, further comprising:
   determining that the user interacted with the physical event location;
   wherein storing the association of the event location identifier with the at least one of the event attributes is based on determining the user interacted with the physical event location.

6. The method of claim 5, wherein determining that the user interacted with the physical event location includes:
   identifying location data of the user; and
   determining that the user interacted with the physical event location based on comparing the location data of the user to the event location identifier.

7. The method of claim 1, wherein the one or more event attributes determined based on the electronic messages include one or more of invitees to the event, likely visitors to the physical event location, a date of the event, a time of the event, a dress code for the event, and a type of event.

8. The method of claim 1, wherein the electronic messages associated with the user include at least a first electronic message generated by the user and at least one second electronic message received by the user.

9. The method of claim 1, wherein the event location identifier of the event attributes is determined based on the electronic messages.

10. The method of claim 1, wherein storing the association of the event location identifier with the at least one of the event attributes includes creating a new entry that defines the association and that has one or more access restrictions.

11. A computer implemented method, comprising:
identifying one or more electronic messages associated with a user;
identifying an event associated with the electronic messages;
determining one or more event attributes of the event, the event attributes including at least one event location identifier identifying a physical event location, wherein determining the one or more event attributes includes determining, based on the event being associated with the electronic messages, at least one of the event attributes based on at least one of the electronic messages;
storing, in association with the user in one or more databases:
an association of the event location identifier with the at least one of the event attributes determined based on the at least one of the electronic messages;
receiving a query that includes a plurality of terms;
identifying the at least one of the event attributes is relevant to the query based on determining that at least one of the terms matches the event location identifier having the stored association with the at least one of the event attributes; and
providing, in response to the query and based on identifying the at least one of the event attributes is relevant to the query, content that is based on the at least one of the event attributes.

12. The method of claim 11, wherein the at least one of the event attributes determined based on the at least one of the electronic messages includes one or more additional users associated with the event; and
wherein the association of the event location identifier with the at least one of the event attributes includes an association of the event location identifier with the one or more additional users associated with the event.

13. The method of claim 11, further comprising:
determining that the user interacted with the physical event location, wherein determining that the user interacted with the physical event location includes:
identifying location data of the user, and
determining that the user interacted with the physical event location based on comparing the location data of the user to the event location identifier; and
wherein storing the association of the event location identifier with the at least one of the event attributes is based on determining the user interacted with the event location.

14. The method of claim 11, wherein the electronic messages associated with the user include at least a first electronic message generated by the user and at least one second electronic message received by the user.

15. The method of claim 11, wherein the event location identifier of the event attributes is determined based on the electronic messages.

16. The method of claim 11, wherein storing the association of the event location identifier with the at least one of the event attributes includes creating a new entry that defines the association and that has one or more access restrictions.

17. A system comprising:
memory storing instructions; and
one or more processors operable to execute the instructions stored in the memory;
wherein the instructions comprise instructions to:
identify one or more electronic messages associated with a user;
identify an event associated with the electronic messages;
determine one or more event attributes of the event, the event attributes including at least one event location identifier identifying a physical event location, wherein the instructions to determine the one or more event attributes include instructions to determine, based on the event being associated with the electronic messages, at least one of the event attributes based on at least one of the electronic messages;
store, in association with the user in one or more databases:
an association of the event location identifier with the at least one of the event attributes determined based on the at least one of the electronic messages;
receive a query that includes a plurality of terms;
identify the event location identifier is relevant to the query based on determining that at least one of the terms matches the at least one of the event attributes having the stored association with the event location identifier; and
provide, in response to the query and based on identifying the event location identifier is relevant to the query, content that is based on the event location identifier.

18. The system of claim 17, wherein the at least one of the event attributes determined based on the at least one of the electronic messages includes one or more additional users associated with the event; and
wherein the association of the event location identifier with the at least one of the event attributes includes an association of the event location identifier with the one or more additional users associated with the event.

19. The system of claim 17, wherein the instructions further comprise instructions to:
determine that the user interacted with the physical event location;
wherein storing the association of the event location identifier with the at least one of the event attributes is based on determining the user interacted with the physical event location.

20. The system of claim 17, wherein the one or more event attributes determined based on the electronic messages include one or more of invitees to the event, likely visitors to the physical event location, a date of the event, a time of the event, a dress code for the event, and a type of event.

* * * * *